US011522871B1

(12) United States Patent
Nimry et al.

(10) Patent No.: US 11,522,871 B1
(45) Date of Patent: *Dec. 6, 2022

(54) VERIFYING SECURE TRANSACTIONS THROUGH DISTRIBUTED NODES

(71) Applicant: Wells Fargo Bank, N.A., San Francisco, CA (US)

(72) Inventors: Basil F. Nimry, Des Moines, IA (US); Nicholas Gillis, West Des Moines, IA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 821 days.

This patent is subject to a terminal disclaimer.

(21) Appl. No.: 16/219,591

(22) Filed: Dec. 13, 2018

Related U.S. Application Data

(63) Continuation of application No. 15/134,022, filed on Apr. 20, 2016, now Pat. No. 10,158,651.

(51) Int. Cl.
*H04L 9/40* (2022.01)
*H04L 9/08* (2006.01)

(52) U.S. Cl.
CPC ............ *H04L 63/123* (2013.01); *H04L 9/085* (2013.01); *H04L 63/061* (2013.01);
(Continued)

(58) Field of Classification Search
None
See application file for complete search history.

(56) References Cited

U.S. PATENT DOCUMENTS

| 8,010,792 B2 * | 8/2011 | Tanaka | H04L 9/0841 713/168 |
| 8,225,084 B2 * | 7/2012 | Kudo | H04L 63/061 713/150 |

(Continued)

FOREIGN PATENT DOCUMENTS

| WO | WO-0232308 A1 * | 4/2002 | ............ G06F 21/32 |
| WO | WO-2009066212 A1 * | 5/2009 | ......... H04L 63/0492 |

OTHER PUBLICATIONS

D. Singelee and B. Preneel, "Location verification using secure distance bounding protocols," IEEE International Conference on Mobile Adhoc and Sensor Systems Conference, 2005., Washington, DC, 2005, p. 7 p. -840, doi: 10.1109/MAHSS.2005.1542879.*
(Continued)

*Primary Examiner* — Jeffrey Nickerson
*Assistant Examiner* — Vadim Savenkov
(74) *Attorney, Agent, or Firm* — Shumaker & Sieffert, P.A.

(57) ABSTRACT

An example client device includes a processor configured construct a key to be used to encrypt or decrypt data of a communication session between the client device and a server device, partition the key into a plurality of key partitions, send data representative of the key and a location of the client device to the server device, send data representative of each of the plurality of key partitions to a respective key verification server device of a plurality of key verification server devices, and after receiving an indication from the server device that the key has been verified using data representative of the key, the location of the client device, and the plurality of key partitions, encrypt or decrypt data exchanged with the server device using the key.

19 Claims, 4 Drawing Sheets

(52) U.S. Cl.
CPC ........ *H04L 63/062* (2013.01); *H04L 63/0823* (2013.01); *H04L 63/0853* (2013.01)

(56) References Cited

U.S. PATENT DOCUMENTS

| | | | |
|---|---|---|---|
| 8,300,824 | B1 | 10/2012 | McGrew et al. |
| 8,949,955 | B2 | 2/2015 | Najaf et al. |
| 8,964,988 | B2 | 2/2015 | Nishimaki et al. |
| 9,118,661 | B1 | 8/2015 | Juels et al. |
| 9,230,377 | B2 | 1/2016 | Gaddam et al. |
| 9,430,655 | B1 | 8/2016 | Stockton et al. |
| 9,830,593 | B2 | 11/2017 | Myers |
| 2002/0067832 | A1 | 6/2002 | Jablon |
| 2004/0025019 | A1 | 2/2004 | Watanabe et al. |
| 2005/0259824 | A1* | 11/2005 | Isozaki ................. H04L 63/061 380/255 |
| 2006/0282675 | A1* | 12/2006 | Yao ....................... H04L 9/3242 713/176 |
| 2011/0124317 | A1 | 5/2011 | Joo |
| 2014/0011458 | A1* | 1/2014 | Koga ..................... B60R 25/24 455/67.11 |
| 2014/0062761 | A1 | 3/2014 | You et al. |
| 2015/0067329 | A1 | 3/2015 | Ben Saied et al. |
| 2015/0089621 | A1 | 3/2015 | Khalid et al. |
| 2016/0094540 | A1 | 3/2016 | Camenisch et al. |
| 2017/0093811 | A1 | 3/2017 | Dolev et al. |
| 2017/0118187 | A1 | 4/2017 | El Khoury et al. |
| 2017/0318002 | A1* | 11/2017 | Okamura .............. H04L 9/3239 |

OTHER PUBLICATIONS

Mills et al. "Network Time Protocol Version 4: Protocol and Algorithms Specification," Internet Engineering Task Force, RFC 5905, Jun. 2010, 110 pp.

Prosecution History from U.S. Appl. No. 15/134,022, dated Feb. 8, 2018 through Aug. 9, 2018, 46 pp.

* cited by examiner

VERIFYING SECURE TRANSACTIONS THROUGH DISTRIBUTED NODES

This application is a continuation of U.S. application Ser. No. 15/134,022, filed Apr. 20, 2016, the entire contents of which are hereby incorporated by reference.

TECHNICAL FIELD

This disclosure relates to key exchange and verification for secure network communications.

BACKGROUND

Computer networks enable communication between computing devices in various locations. Communications over computer networks may traverse many devices, such as computers, routers, hubs, switches, firewalls, and the like. Encryption of important data, such as financial transaction data, is important, to prevent unauthorized access by third parties to the data when such data is communicated over computer networks.

Data of a network session is typically encrypted using a key that is shared by one of two mechanisms. In some instances, a static key is used to encrypt data of a network session. The static key is pre-shared, that is, generated and shared before the communication session is established. The static key may be used for a long period of time, e.g., for multiple network transactions. In other instances, such as in Transport Layer Security (TLS) or Secured Socket Layer (SSL), one device will create a session key to be used to encrypt data of the communication session. The device may encrypt the session key with the public key of another device of the communication session.

SUMMARY

In general, this disclosure describes techniques for exchanging a key used for secure network communications. Rather than using a static, pre-shared key or public key cryptography, this disclosure describes techniques that use a dynamically created key that may be verified using multiple trusted servers. In particular, a client device may construct they key and send the key to a server device in a secure manner, e.g., using Transport Layer Security (TLS) or Secured Socket Layer (SSL) or other public key infrastructure methodologies. However, to verify the key, the server device may send instructions to the client device to partition the key into multiple key partitions, as well as indications of key verification server devices to which to send the key partitions. The server device may also determine a location of the client device, e.g., by requesting the current location of the client device.

The client device may then send the key partitions to the key verification server devices, which may receive the key partitions and determine when the key partitions were received. Based on the location of the client device and locations of the key verification server devices (and more particularly, distances between the location of the client device and the locations of the key verification server devices), approximate times at which to expect to receive the key partitions can be determined (e.g., by the server device and/or by the key verification server devices). The key verification server devices may then report the time at which the key partitions were received and/or whether the key partitions were received within the expected period of time to the server device.

In this manner, the techniques of this disclosure may be used to prevent a man-in-the-middle attack, because a malicious device that intercepts part of the transaction between the client device and the server device would not be in the same location as the client device. Therefore, even if the malicious device were to send one or more of the key partitions to the key verification server devices, the key verification server devices would determine that the key partitions from the malicious device were received outside of the expected times for receiving the key partitions.

In one example, a method includes, by one or more processors of a client device, constructing a key to be used to encrypt or decrypt data of a communication session between the client device and a server device, partitioning the key into a plurality of key partitions, sending data representative of each of the plurality of key partitions to a respective key verification server device of a plurality of key verification server devices, comprising sending data representative of a first key partition of the plurality of key partitions to a first key verification server device of the plurality of key verification server devices, and sending data representative of a second key partition of the plurality of key partitions to a second key verification server device of the plurality of key verification server devices, wherein the first key partition is different than the second key partition and the first key verification server device is different than the second key verification server device, and, after receiving an indication from the server device that the key has been verified using the plurality of key partitions, encrypting or decrypting data exchanged with the server device via the communication session using the key.

In another example, a method includes, by one or more processors of a server device, receiving data representative of a location of a client device participating in a communication session with the server device, wherein data of the communication session is to be encrypted or decrypted using a key, receiving data representative of each of a plurality of key partitions of the key from a respective key verification server device of a plurality of key verification server devices and data representing whether the plurality of key partitions were received by the respective key verification server devices within respective expected time periods based on the location of the client device and locations of the key verification server devices, comprising receiving data representative of a first key partition of the plurality of key partitions from a first key verification server device of the plurality of key verification server devices and data representing whether the first key partition was received by the first key verification server device within a first expected time period based on the location of the client device and a first location of the first key verification server device, and receiving data representative of a second key partition of the plurality of key partitions to a second key verification server device of the plurality of key verification server devices and data representing whether the second key partition was received by the second key verification server device within a second expected time period based on the location of the client device and a second location of the second key verification server device, wherein the first key partition is different than the second key partition and the first key verification server device is different than the second key verification server device, and when each of the plurality of key partitions was received by the respective key verification server devices within the respective expected time periods, encrypting or decrypting data exchanged with the server device via the communication session using the key.

In another example, a client device includes a network interface configured to send and receive data via a network, and a processor configured to construct a key to be used to encrypt or decrypt data of a communication session between the client device and a server device, partition the key into a plurality of key partitions, send, via the network interface, data representative of the key and a location of the client device to the server device, send, via the network interface, data representative of each of the plurality of key partitions to a respective key verification server device of a plurality of key verification server devices, wherein to send the data representative of each of the plurality of key partitions, the processor is configured to send data representative of a first key partition of the plurality of key partitions to a first key verification server device of the plurality of key verification server devices, and send data representative of a second key partition of the plurality of key partitions to a second key verification server device of the plurality of key verification server devices, wherein the first key partition is different than the second key partition and the first key verification server device is different than the second key verification server device, and after receiving an indication from the server device that the key has been verified using data representative of the key, the location of the client device, and the plurality of key partitions, encrypt or decrypt data exchanged with the server device via the network interface using the key.

In another example, a server device includes a network interface configured to send and receive data via a network, and a processor configured to receive data representative of a location of a client device participating in a communication session with the server device, wherein data of the communication session is to be encrypted or decrypted using a key, receive data representative of each of a plurality of key partitions of the key from a respective key verification server device of a plurality of key verification server devices and data representing whether the plurality of key partitions were received by the respective key verification server devices within respective expected time periods based on the location of the client device and locations of the key verification server devices, wherein to receive the data representative of each of the plurality of key partitions, the processor is configured to receive data representative of a first key partition of the plurality of key partitions from a first key verification server device of the plurality of key verification server devices and data representing whether the first key partition was received by the first key verification server device within a first expected time period based on the location of the client device and a first location of the first key verification server device, and receive data representative of a second key partition of the plurality of key partitions to a second key verification server device of the plurality of key verification server devices and data representing whether the second key partition was received by the second key verification server device within a second expected time period based on the location of the client device and a second location of the second key verification server device, wherein the first key partition is different than the second key partition and the first key verification server device is different than the second key verification server device, and when each of the plurality of key partitions was received by the respective key verification server devices within the respective expected time periods, encrypting or decrypting data exchanged with the server device via the communication session using the key.

In another example, a computer-readable medium, such as a computer-readable storage medium, has stored thereon instructions that, when executed, cause a processor of a client device to construct a key to be used to encrypt or decrypt data of a communication session between the client device and a server device, partition the key into a plurality of key partitions, send, via the network interface, data representative of the key and a location of the client device to the server device, send, via the network interface, data representative of each of the plurality of key partitions to a respective key verification server device of a plurality of key verification server devices, wherein to send the data representative of each of the plurality of key partitions, the processor is configured to send data representative of a first key partition of the plurality of key partitions to a first key verification server device of the plurality of key verification server devices, and send data representative of a second key partition of the plurality of key partitions to a second key verification server device of the plurality of key verification server devices, wherein the first key partition is different than the second key partition and the first key verification server device is different than the second key verification server device, and after receiving an indication from the server device that the key has been verified using data representative of the key, the location of the client device, and the plurality of key partitions, encrypt or decrypt data exchanged with the server device via the network interface using the key.

In another example, a computer-readable medium, such as a computer-readable storage medium, has stored thereon instructions that, when executed, cause a processor of a server device to receive data representative of a location of a client device participating in a communication session with the server device, wherein data of the communication session is to be encrypted or decrypted using a key, receive data representative of each of a plurality of key partitions of the key from a respective key verification server device of a plurality of key verification server devices and data representing whether the plurality of key partitions were received by the respective key verification server devices within respective expected time periods based on the location of the client device and locations of the key verification server devices, wherein to receive the data representative of each of the plurality of key partitions, the processor is configured to receive data representative of a first key partition of the plurality of key partitions from a first key verification server device of the plurality of key verification server devices and data representing whether the first key partition was received by the first key verification server device within a first expected time period based on the location of the client device and a first location of the first key verification server device, and receive data representative of a second key partition of the plurality of key partitions to a second key verification server device of the plurality of key verification server devices and data representing whether the second key partition was received by the second key verification server device within a second expected time period based on the location of the client device and a second location of the second key verification server device, wherein the first key partition is different than the second key partition and the first key verification server device is different than the second key verification server device, and when each of the plurality of key partitions was received by the respective key verification server devices within the respective expected time periods, encrypting or decrypting data exchanged with the server device via the communication session using the key.

The details of one or more examples are set forth in the accompanying drawings and the description below. Other features, objects, and advantages will be apparent from the description and drawings, and from the claims.

DETAILED DESCRIPTION

Figure 1:
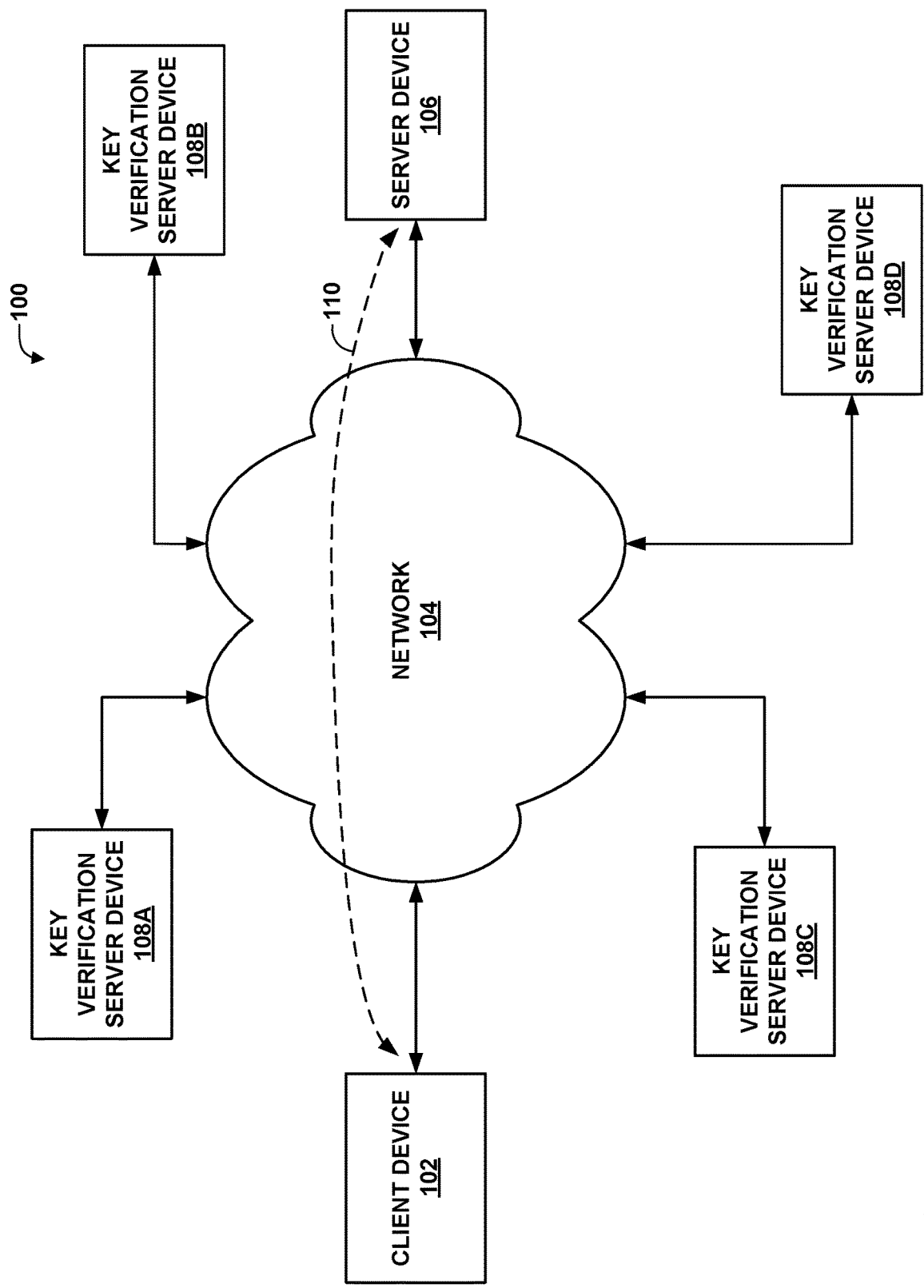
FIG. 1 is a block diagram illustrating an example system including computing devices that may be configured to perform the techniques of this disclosure.

FIG. 1 is a block diagram illustrating an example system 100 including computing devices that may be configured to perform the techniques of this disclosure. In particular, system 100 includes client device 102 and server device 106, which are communicatively coupled via network 104 and participate in communication session 110. System 100 also includes key verification server devices 108A-108D (key verification server devices 108). Although four key verification server devices 108 are shown in the example of FIG. 1, in general, there may be any number of key verification server devices 108. Key verification server devices 108 may also be referred to as "distributed nodes."

Client device 102 may correspond to any of a variety of devices. For example, client device 102 may correspond to a stationary computing device, such as a personal computer, or a mobile device, such as a cellular telephone, a laptop, a smartphone, a tablet, a personal digital assistant (PDA), or the like. In general, a user may interact with client device 102 to communicate with network devices via network 104.

Network 104 may represent any arrangement of network devices for interconnecting computing devices, such as client device 102 and server device 106. For example, network 104 may include a plurality of routers, switches, hubs, gateways, security devices such as firewalls, or the like. Network 104 may correspond to or include the Internet.

Server device 106 represents a device that provides one or more services that are available to client devices, such as client device 102, via network 104. In general, such services may require secured (e.g., encrypted) communication. For example, server device 106 may represent a server device for an online merchant or retailer, a bank, an enterprise, or the like.

In accordance with the techniques of this disclosure, server device 106 coordinates with key verification server devices 108 to verify a key used to secure (e.g., encrypt) data of a communication session (such as communication session 110). In conventional techniques, a key used to encrypt data of a communication session, or other data of the communication session, may be intercepted by a third party device. For example, a client device may send the key to a server device, and the third party device may intercept the key. The third party may then determine data representative of the client device and misrepresent a transaction to the server device as if the third party device was client device 102.

In accordance with the techniques of this disclosure, client device 102 may initially send a key for communication session 110 to server device 106. Server device 106 may send instructions to partition the key into key partitions, and send each of the key partitions to a respective one of key verification server devices 108. For example, client device 102 may send a first key partition to key verification server device 108A, a second key partition to key verification server device 108B, and so on. Key verification server devices 108 are distributed among various geographic locations. For example, key verification server device 108A may be located in Portland, Oreg., key verification server device 108B may be located in Chicago, Ill., key verification server device 108C may be located in San Francisco, Calif., and key verification server device 108D may be located in Manhattan, N.Y. Of course, additional or alternative key verification server devices may be located elsewhere, and not necessarily restricted to a single country or region.

In general, network communication times can be predicted based on the distance between two devices, and such times can be measured heuristically over time. Key verification server devices 108 may be configured to determine communication times with devices at various locations over time, and store data representative of such communication times. Key verification server devices 108 and server device 106 may have respective internal clocks that are synchronized, e.g., using Network Time Protocol (NTP). NTP is described in Mills et al., "Network Time Protocol Version 4: Protocol and Algorithms Specification," Internet Engineering Task Force, RFC 5905, June 2010, available at tools.ietf.org/html/rfc5905.

Server device 106 and/or key verification server devices 108 may be configured to determine expected times at which the key partitions should arrive at the various key verification server devices 108, based on the locations of client device 102 and key verification server devices 108. For example, server device 106 and/or key verification server devices 108 may correlate the distances between the location of client device 102 and the locations of key verification server devices 108, and communication times over the various distances to determine expected times at which each of the key partitions should arrive at key verification server devices 108.

Accordingly, client device 102 may partition the key into the key partitions and send the key partitions to one or more of key verification server devices 108, in accordance with instructions received from server device 106. In some examples, key verification server devices 108 may determine whether the respective key partitions are received within the expected time. In other examples, key verification server devices 108 may send the received key partition and a time representative of when the key partition was received to server device 106. In any case, server device 106 may determine whether each of the key partitions was received by a corresponding one of key verification server devices 108 within the expected time. If so, server device 106 may determine that the key is verified and communicate with client device 102 using the key, e.g., using the key to encrypt and/or decrypt data of communication session 110.

Key verification server devices 108 (and in some examples, server device 106) may be configured according to one or more protocols to maintain clock synchronization. As noted above, key verification server devices 108 (and server device 106 in some examples) may use NTP to maintain clock synchronization. Additionally or alternatively, key verification server devices 108 and server device 106 may maintain heartbeat communications (that is, regular communications between each other, such as pings) to determine normal rates of traffic between each other. In general, a spike of traffic may represent a current threat, while a gradual increase may represent a warning of a possible threat.

In general, key verification server devices 108 and/or server device 106 may be configured to measure lag associated with packet transmissions, to ensure that communications between each other and/or other devices (such as client device 102) have not been tampered with. For example, if there is typically a 0.01 second delay on transmissions between key verification server device 108A and server device 106, and this delay increases to 0.02 seconds, key verification server device 108A and/or server device 106 may infer that communications of one or both devices are being intercepted. Thus, routing of traffic to either or both of key verification server device 108A and server device 106 may be changed (e.g., to avoid either or both of key verification server device 108A and server device 106).

Although key verification server devices 108 are referred to as "devices," it should be understood that key verification server devices 108 may be implemented as hardware-based server devices or virtual server devices. Of course, virtual server devices, when deployed, are operated on hardware devices as well, e.g., server blades including memory and one or more processors. Thus, functionality attributed to any or all of key verification server devices 108 may in fact be performed by a virtual server device.

Server device 106 may instruct client device 102 as to which of key verifications server devices 108 to send key partitions and, in some examples, in what order the key partitions are to be sent. Alternatively, client device 102 may send data to server device 106 representing which of key verification server devices 108 from which to expect to receive the key partitions, and an order in which to expect to receive the key partitions (or an order in which the key partitions are being sent to the respective key verification server devices 108). Since delays from key verification server devices 108 are measured in real time for a threat, and the time between client device 102 and server device 106 can also be measured, server device 106 may form a predictive model of when a communication can be sent across network 104 and recompiled in the correct order. Any tampering with client device 102, key verification server devices 108, and/or server device 106, or communications to or from such devices, would result in the order of the key partitions not arriving back to server device 106 and/or back to client device 102 correctly. If this happens, server device 106 and/or client device 102 may determine that the transaction (e.g., communication session 110) is suspect. Suspect transactions may be delayed or canceled.

In an example of operation, client device 102 registers a transaction (e.g., communication session 110) with server device 106. Client device 102 also notifies a distributed network of "authoritative" servers (key verification server devices 108) that route verification of transaction authenticity. Key verification server devices 108 may verify authenticity in a few parts. First, verification of transaction authenticity may be achieved through time lag between key verification server devices 108 to ensure no middle-man is intercepting and modifying data of a data stream. Such interception and modification would increase the delay noticeably. Second, verification of transaction authenticity may be achieved through a key. The key can be any form of data. This key data may be data that client device 102 passes through key verification server devices 108, broken down into several parts (key partitions) that are passed around key verification server devices 108. Part of the key use may be assembly of the key, which may be done by signifying which of key verification server devices 108 are to return the key part in a specific order and at a specific time interval, e.g., to server device 106. Should any part of the re-composition be interfered with, then server device 106 may reject the initial transaction or instruct client device 102 to attempt the transaction again. On subsequent attempts, different permutations of key verification server devices 108 may be used.

Thus, whereas conventional technologies provide a one-to-one solution with a verification server acting as a third party, the techniques of this disclosure may be considered a "hive system" of servers (that is, key verification server devices 108 and server device 106) that pass data from one point to another in a form of organized chaos. Attacking the hive may be difficult. For example, attacking more than 50% of the hive may be required to harm the system. Attacking the hive may cause computing devices forming the hive to react by killing off affected nodes quickly and setting them back up with brand new nodes in a virtual machine (VM) type environment. Additionally, a "server device" should not necessarily be understood as a physical asset, as many servers can be virtualized, which may add additional threads to the web of complexity.

The techniques of this disclosure may overcome various problems that may arise in conventional technologies. For example, in public key cryptography technologies, in order to verify that data originates from a particular device (e.g., to sign data), the device must obtain a digital certificate from a certificate authority. Acquisition of such a digital certificate is often expensive. Furthermore, such certificates can be cloned. The techniques of this disclosure, on the other hand, can verify a transaction without the use of a certificate from a certificate authority, through the use of a location of a client device initiating a transaction to be verified, and of key verifying server devices 108.

Figure 2:
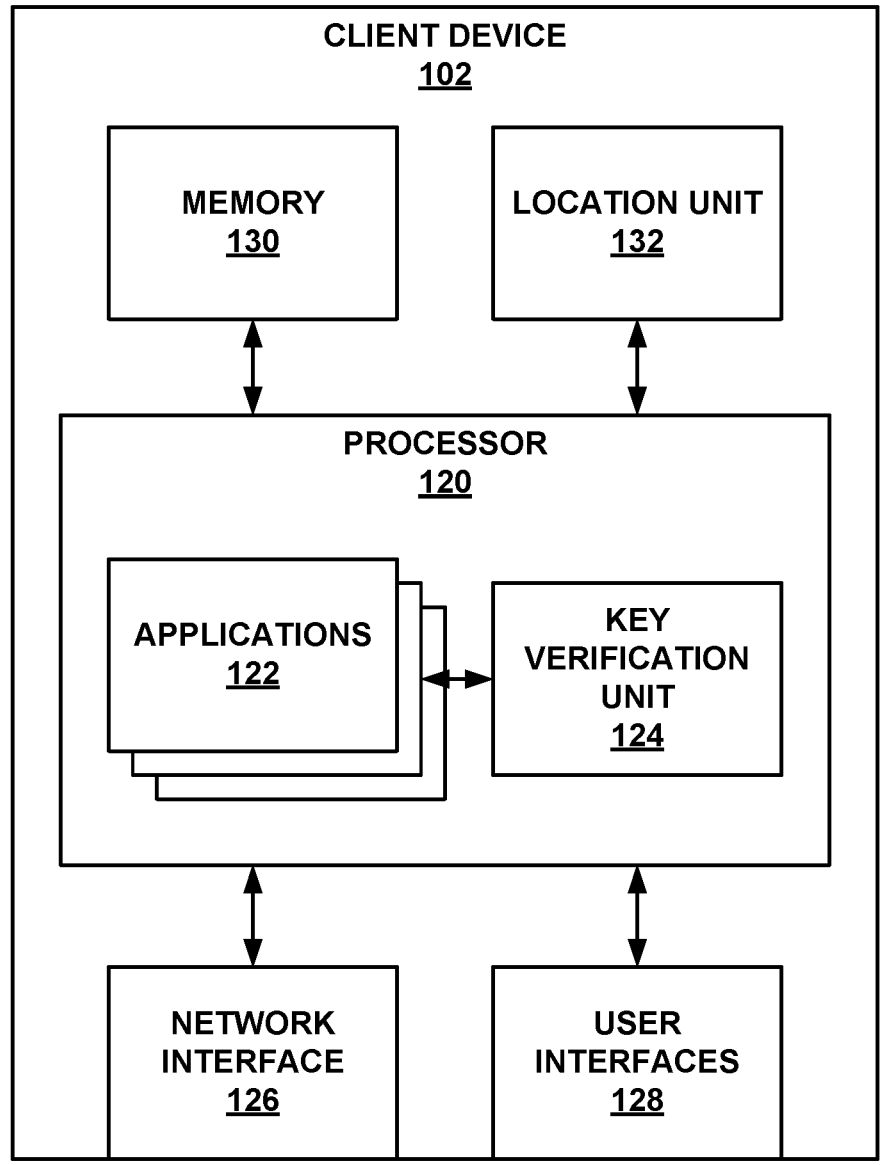
FIG. 2 is a block diagram illustrating an example arrangement of components of a client device in accordance with the techniques of this disclosure.

FIG. 2 is a block diagram illustrating an example arrangement of components of client device 102. In this example, client device 102 includes processor 120, memory 130, location unit 132, network interface 126, and user interfaces 128. Processor 120 executes applications 122 and key verification unit 124. Instructions for applications 122 and key verification unit 124 may be stored in memory 130.

Memory 130 may represent one or more of any of a variety of random access memory (RAM), read-only memory (ROM), and/or long-term storage memory, alone or in any combination. Processor 120 may represent one or more processing units, such as a single hardware-based processor, multiple cores of a processor, multiple processors operating together, digital signal processors (DSPs), application specific integrated circuits (ASICs), field programmable gate arrays (FPGAs), or any combination thereof. In general, processor 120 is implemented as, or at least includes, hardware-based elements, such as processing circuitry (e.g., computer chips, including logic circuitry, formed on silicon dies). Location unit 132 represents any unit for determining a current location of client device 102, such as a global positioning system (GPS) unit. Additionally or alternatively, location unit 132 may use cellular telephone system information and/or an Internet protocol (IP) address of client device 102 to determine a current location of client device 102.

Network interface 126 represents one or more interfaces for communicating via a network, such as network 104. Network interface 126 may represent, for example, one or more of a network interface card (NIC), a radio for communicating over a radio access network (RAN), a wireless network card (which may conform to one or more IEEE 802.11 standards), or the like, alone or in any combination.

User interfaces 128 represent any interfaces for receiving input from and/or providing output to a user. User interfaces 128 may include, for example, any or all of a keyboard, mouse, touch pad, track pad, universal serial bus (USB), speaker, display, touchscreen, camera, microphone, physical button, printer, or the like, alone or in any combination.

Applications 122 represent various applications that processor 120 executes, e.g., at the direction of receiving input from a user via user interfaces 128. Applications 122 generally represent any applications that can be executed by a device, such as client device 102. In accordance with this disclosure, one or more of applications 122 may represent applications that perform a secure communication session with a server device, such as server device 106 (FIG. 1). For example, applications 122 may include mobile banking applications, stock brokerage applications, virtual private network (VPN) applications, online merchant applications (such as online music vendors, online video vendors, online retail vendors, or the like), or any other such applications needing secured communication sessions.

When one of applications 122 is to initiate a secured communication session with server device 106, processor 120 may execute key verification unit 124 to perform various techniques of this disclosure. For example, processor 120 may execute key verification unit 124 to construct a key to be used for the secured communication session. Key verification unit 124 may construct the key in any of a variety of ways. In one example, key verification unit 124 may concatenate a list of characteristics of client device 102 (e.g., device name, device serial number, etc.), a list of current characteristics (current date, current time, geographic location of client device 102, etc.), and/or one or more randomly generated values to construct the key. Key verification unit 124 may randomly determine which of these various elements to include in the key. In some examples, key verification unit 124 may construct the key only from randomly generated data. Alternatively, key verification unit 124 may receive a key from the server device to be used for the communication session. Furthermore, key verification unit 124 may initially send a location of client device 102 (determined by location unit 132) to server device 106.

Key verification unit 124 may also determine several of key verification server devices 108 (FIG. 1) to which to send key partitions of the key. For example, key verification unit 124 may receive instructions from server device 108 as to which of the key verification server devices to send the key partitions, and in some examples, an order in which to send the key partitions. Alternatively, key verification unit 124 may send a message to server device 108 indicating which of the key verification server devices 108 the key partitions will be sent, and in some examples, the order in which the key partitions will be sent. In some examples, key verification unit 124 initially sends the key to (or receives the key from) server device 106, which may cause server device 106 to compare the key to a concatenation of the key partitions to authenticate the key after server device 106 subsequently receives the key partitions.

Key verification unit 124 may also partition the key into the key partitions. In general, partitioning the key includes dividing data for the key into two or more distinct pieces. Such partitioning may occur at ASCII character boundaries, byte boundaries, hexadecimal boundaries, or any other unit (e.g., down to individual bits of the key). In this manner, key partitions need not necessarily be byte-aligned, in which case key verification unit 124 may pad the values of a non-byte-aligned key partition with values (e.g., 0's) to form a byte-aligned key partition value. The key partitions need not necessarily be equal in length. That is, key verification unit 124 may form two or more key partitions having different lengths from each other. Key verification unit 124 may receive instructions from server device 106 representing how the key is to be partitioned, and partition the key into the key partitions according to these instructions.

Key verification unit 124 may then send the key partitions to the corresponding key verification server devices 108. That is, key verification unit 124 may send a first key partition to, e.g., key verification server device 108A, a second key partition to key verification server device 108B, and so on. The key partitions may be distinct from each other, as noted above. Thus, different key partitions may be sent to different ones of key verification server devices 108. In some examples, portions of key partitions may overlap with each other, and therefore, some but not all of the key partitions may be the same. Of course, in some examples, key verification unit 124 may send the same key partition to multiple key verification server devices 108. In general, however, key verification unit 124 will send at least somewhat different key partitions to at least two of key verification server devices 108.

After sending the key partitions to key verification server devices 108, server device 106 may ultimately determine whether the transaction is authenticated, as explained in greater detail below. Key verification unit 124 may then receive data representative of whether the transaction is authenticated from server device 106. If the transaction is authenticated, key verification unit 124 (or a different unit, such as one of applications 122 or processor 120 generally) may use the key to encrypt or decrypt data transmitted via the communication session with server device 106. In one example, key verification unit 124 encrypts data to be sent to server device 106 with the key and decrypts data received from server device 106 with the key.

In this manner, client device 102 represents an example of a client device including a network interface configured to send and receive data via a network, and a processor configured to construct a key to be used to encrypt or decrypt data of a communication session between the client device and a server device, partition the key into a plurality of key partitions, send, via the network interface, data representative of the key and a location of the client device to the server device, send, via the network interface, data representative of each of the plurality of key partitions to a respective key verification server device of a plurality of key verification server devices, wherein to send the data representative of each of the plurality of key partitions, the processor is configured to send data representative of a first key partition of the plurality of key partitions to a first key verification server device of the plurality of key verification server devices, and send data representative of a second key partition of the plurality of key partitions to a second key verification server device of the plurality of key verification server devices, wherein the first key partition is different than the second key partition and the first key verification server device is different than the second key verification server device, and after receiving an indication from the server device that the key has been verified using data representative of the key, the location of the client device, and the plurality of key partitions, encrypt or decrypt data exchanged with the server device via the network interface using the key.

Figure 3:
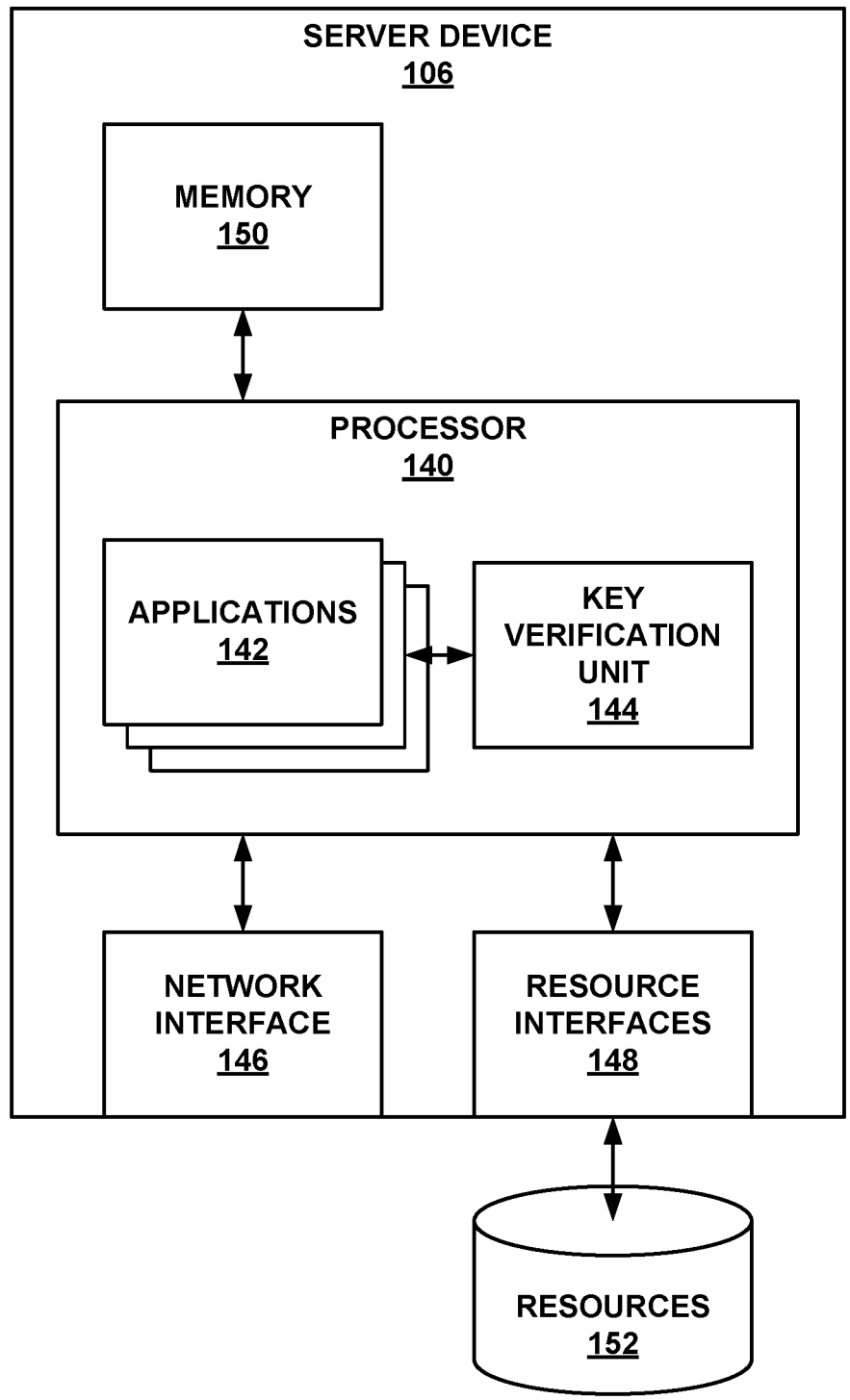
FIG. 3 is a block diagram illustrating an example arrangement of components of a server device in accordance with the techniques of this disclosure.

FIG. 3 is a block diagram illustrating an example arrangement of components of server device 106. In this example, server device 106 includes processor 140, memory 150, network interface 146, and resource interfaces 148. Processor 140 executes applications 142 and key verification unit 144. Instructions for applications 142 and key verification unit 144 may be stored in memory 150.

Memory 140 may represent one or more of any of a variety of random access memory (RAM), read-only memory (ROM), and/or long-term storage memory, alone or in any combination. Processor 140 may represent one or more processing units, such as a single hardware-based processor, multiple cores of a processor, multiple processors operating together, digital signal processors (DSPs), application specific integrated circuits (ASICs), field programmable gate arrays (FPGAs), or any combination thereof. In general, processor 140 is implemented as, or at least includes, hardware-based elements, such as processing circuitry (e.g., computer chips, including logic circuitry, formed on silicon dies).

Network interface 146 represents one or more interfaces for communicating via a network, such as network 104. Network interface 146 may represent, for example, one or more of a network interface card (NIC), a radio for communicating over a radio access network (RAN), a wireless network card (which may conform to one or more IEEE 802.11 standards), or the like, alone or in any combination.

Resource interfaces 148 represent one or more interfaces for manipulating resources 152. Resources 152 may include, for example, one or more external resources to server device 106, such as, for example, other server devices, processes, databases, or the like. Other server devices may include, for example, file servers, email servers, print servers, analysis servers, accounting servers, web servers, or the like.

Applications 142 represent various applications that processor 140 executes, e.g., in response to requests from remote computing devices, such as client device 102. One or more of applications 142 may perform local processing in response to requests from client device 102. Applications 142 may also process requests for access to resources 152. In accordance with this disclosure, one or more of applications 142 may represent applications that perform a secure communication session with a client device, such as client device 102 (FIG. 1). For example, applications 142 may include servers that provide data for mobile banking applications, stock brokerage applications, virtual private network (VPN) applications, online merchant applications (such as online music vendors, online video vendors, online retail vendors, or the like), or any other such applications needing secured communication sessions.

In accordance with the techniques of this disclosure, one or more of applications 142 may interact with key verification unit 144 to verify a key for a secured communication sessions using key partitions received from key verification server devices 108 (FIG. 1). For example, initially, client device 102 may request a communication session with server device 106, as determined by one or more of applications 142. Server device 106 may determine that the communication session is to be secured, e.g., encrypted. For example, client device 102 may send a key and a location of client device 102 to server device 106. Alternatively, server device 106 may send the key to client device 102.

Key verification unit 144 may determine a set of key verification server devices 108 to which client device 102 is to send key partitions of the key for verification of the key and the communication session. For example, key verification unit 144 may determine a number of key verification server devices 108 to which client device 102 is to send the key partitions, e.g., based on locations of key verification server devices 108 compared to the location of client device 102. Key verification unit 144 may request that client device 102 send key partitions to one or more key verification server devices 108 that are geographically close to the location of client device 102, and to one or more key verification server devices 108 that are geographically distant from the location of client device 102. In any case, key verification unit 144 may send instructions to client device 102 indicating to which of key verification server devices 108 to send the key partitions. In some examples, key verification unit 144 may further send an order in which the key partitions are to be sent to the respective key verification server devices 108.

Key verification unit 144 may also send instructions to client device 102 representing how to partition the key into the key partitions. As explained above, partitioning the key includes dividing data for the key into two or more distinct pieces. Such partitioning may occur at ASCII character boundaries, byte boundaries, hexadecimal boundaries, or any other unit (e.g., down to individual bits of the key). In this manner, key partitions need not necessarily be byte-aligned, in which case key verification unit 144 may receive padded values of a non-byte-aligned key partition, and remove the padding to assemble (e.g., concatenate) the key partitions to reproduce the key. The key partitions need not necessarily be equal in length. That is, key verification unit 144 may receive two or more key partitions having different lengths from each other.

Key verification unit 144 may receive the key partitions from key verification server devices 108. In some examples, key verification unit 144 may determine expected times at which key verification server devices 108 should receive the respective key partitions, based on distances between the location of client device 102 and the locations of key verification server devices 108 and, in some examples, the order in which the key partitions are to be sent to the key verification server devices 108. In other examples, key verification unit 144 may send the location of client device 102 and the order in which a corresponding key partition is to be sent to each of key verification server devices 108, and key verification server devices 108 may determine an expected time at which a corresponding key partition is to be received.

In any case, key verification unit 144 may receive data from the key verification server devices 108 representing whether the corresponding key partition was received within the corresponding expected time. In some examples, such data may simply be the time at which the corresponding one of key verification server devices 108 received the key partition, and the key partition itself. In other examples, such data may be a combination of the key partition and a message representing whether or not the corresponding one of key verification server devices 108 in fact received the key partition within the expected time. In some examples, when the expected time elapses (potentially with the addition of a delay period), and one of key verification server devices 108 has not received its corresponding key partition, the one of key verification server devices 108 may send data indicating that the key partition has not been received to server device 106.

Key verification unit 144 may use data received from key verification server devices 108 to determine whether or not the key (and, hence, the communication session) is verified (that is, determined to actually originate from client device 102). For example, key verification unit 144 may determine whether each of the key partitions was received within the expected time. Key verification unit 144 may also assemble the key from the received key partitions, e.g., by concatenating the received key partitions, and compare the concatenated key partitions to the original key for the communication session. If at least one key partition was not received within its expected time, or if the concatenated key partitions do not match the original key, key verification unit 144 may drop the communication session, instruct client device 102 to retry the key verification process, or the like. Otherwise, key verification unit 144 may use the key to encrypt or decrypt data exchanged via the communication session.

In this manner, server device 106 represents an example of a server device including a network interface configured to send and receive data via a network, and a processor configured to receive data representative of a location of a client device participating in a communication session with the server device, wherein data of the communication session is to be encrypted or decrypted using a key, receive data representative of each of a plurality of key partitions of the key from a respective key verification server device of a plurality of key verification server devices and data representing whether the plurality of key partitions were received by the respective key verification server devices within respective expected time periods based on the location of the client device and locations of the key verification server devices, wherein to receive the data representative of each of the plurality of key partitions, the processor is configured to receive data representative of a first key partition of the plurality of key partitions from a first key verification server device of the plurality of key verification server devices and data representing whether the first key partition was received by the first key verification server device within a first expected time period based on the location of the client device and a first location of the first key verification server device, and receive data representative of a second key partition of the plurality of key partitions to a second key verification server device of the plurality of key verification server devices and data representing whether the second key partition was received by the second key verification server device within a second expected time period based on the location of the client device and a second location of the second key verification server device, wherein the first key partition is different than the second key partition and the first key verification server device is different than the second key verification server device, and when each of the plurality of key partitions was received by the respective key verification server devices within the respective expected time periods, encrypting or decrypting data exchanged with the server device via the communication session using the key.

Figure 4:
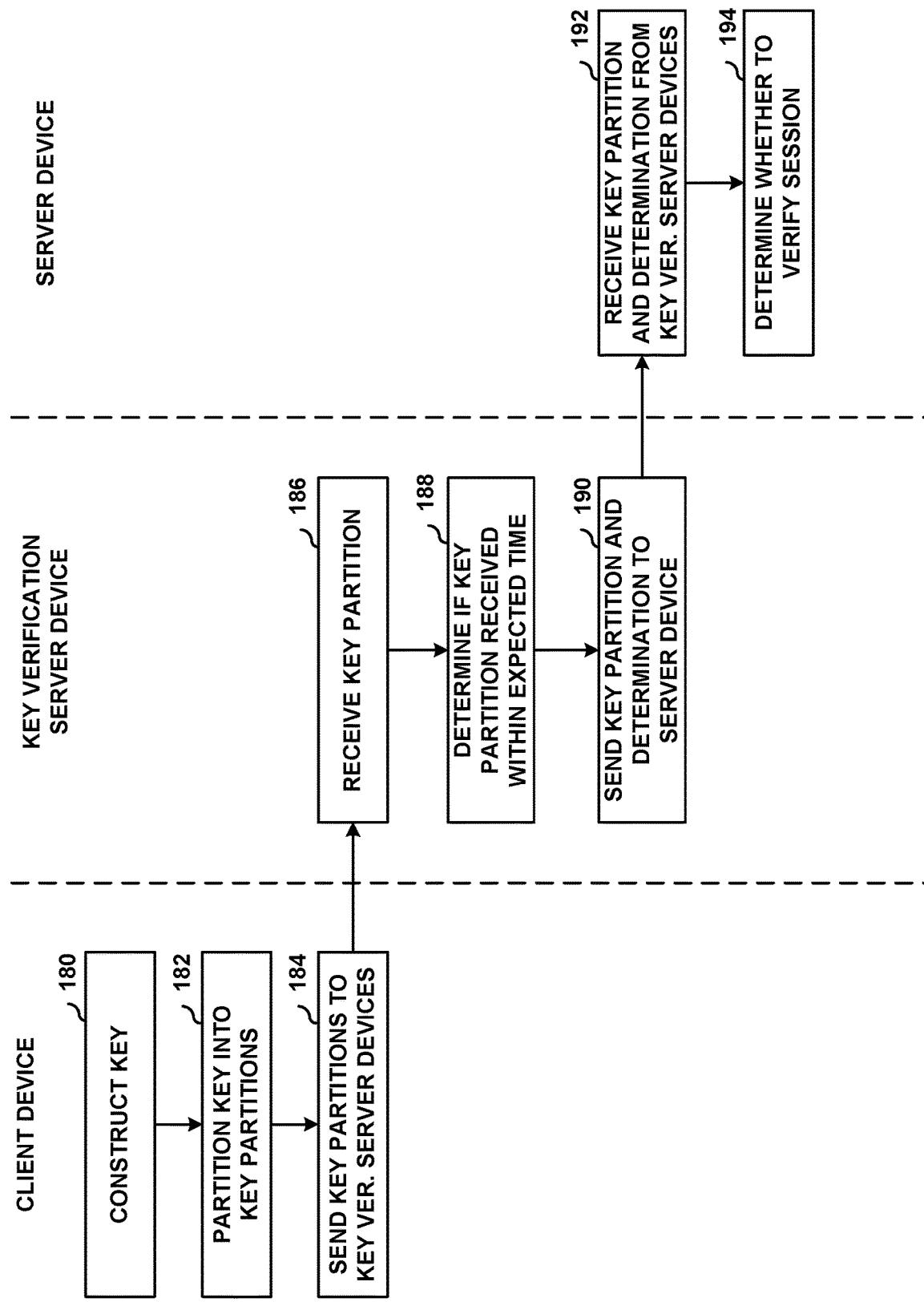
FIG. 4 is a flowchart illustrating an example method in accordance with the techniques of this disclosure.

FIG. 4 is a flowchart illustrating an example method in accordance with the techniques of this disclosure. In this example, various parts of the method are described as being performed by client device 102, server device 106, and key verification server devices 108. However, other devices may be configured to perform the various aspects of this method. Moreover, additional or alternative steps may be performed. Various alternatives are described below, and the various alternatives discussed above may also be performed as part of the method.

In the example of FIG. 4, client device 102 initially constructs a key (180) to be used for a communication session. For example, as discussed above, client device 102 may construct the key by concatenating a list of characteristics of client device 102 with a list of current characteristics, and or one or more randomly generated values, to construct the key. Alternatively, client device 102 may request a key from server device 106 for the communication session. In some examples, client device 102 may initially send the key to server device 106, which may cause server device 106 to subsequently compare the key to a concatenation of key partitions, as explained below. Moreover, client device 102 may send a geographic location of client device 102 to server device 106.

Client device 102 then, in this example, partitions the key into a plurality of key partitions (182). For example, client device 102 may receive instructions from server device 106 indicating how to partition the key into the key partitions. The instructions may indicate, for example, a number of characters, bytes, or bits to use for each key partition (which need not necessarily be the same for each of the key partitions), a list of key verification server devices 108 to which to send the key partitions, an order in which the key partitions are to be sent to the key verification server devices 108, or other such data.

Client device 102 may then send the key partitions to the key verification (ver.) server devices 108 (184). For example, client device 102 may send the key partitions in an order as instructed by server device 106, or may send the key partitions in the order in which they occur in the key. In some examples, the key partitions are each distinct from each other, such that when concatenated, the key partitions reform the original key. However, in other examples, data from some portions of the key partitions may be replicated. For example, client device 102 may send the same key partition to two or more different key verification server devices 108. In general, however, at least two of the key partitions sent to at least two of the key verification server devices will be distinct from each other.

The actions performed by only one of key verification server devices 108 are shown in the example of FIG. 4 for brevity, but it should be understood that other key verification server devices 108 may perform substantially similar or identical actions. In this example, the one of key verification server devices 108 receives a key partition (186) from client device 102. The one of key verification server devices 108 then determines if the key partition was received within an expected time (188). The expected time may correspond to a distance between the geographic locations of the one of key verification server devices 108 and client device 102. In some examples, the one of key verification server devices 108 determines the expected time, while in other examples, the one of key verification server devices 108 receives data indicative of the expected time from server device 106. In still other examples, the one of key verification server devices may simply forward the key partition to server device 106, without determining whether the key partition was received within an expected time. In any case, assuming the one of key verification server devices 108 has received the key partition, the one of key verification server devices 108 sends the key partition and the determination of whether the key partition was received within the expected time to server device 106 (190).

Server device 106 may then receive the key partitions and data representative of determinations of whether the key partitions were received within respective expected times from each of the key verification server devices 108 (192). Server device 106 may then determine whether each of the key verification server devices 108 received its respective key partition within the respective expected time. In some examples, server device 106 receives binary indications from the key verification server devices 108 (e.g., a single-bit flag), and performs a bitwise AND across the indications (e.g., the flags) to determine whether each key partition was received within a respective expected time. In other examples, server device 106 may determine expected times and compare timestamps from key verification server devices 108 representing when the corresponding key partition was received to the corresponding expected time, for each key partition. In any case, server device 106 may determine whether to verify the session (194) based on whether the key partitions were received within the expected times. Moreover, server device 106 may determine whether to verify the session based on whether a concatenation of the key partitions yields the original key, e.g., the key constructed at (180).

In response to verifying the session, client device 102 and server device 106 may encrypt or decrypt data exchanged via the communication session using the key. In some examples, server device 106 may initially send a message indicating that the key has been verified (and hence, that the session has been verified) to client device 102. In some examples, the message indicating that the key has been verified may include the key itself. This may cause client device 102 to compare the received key to the originally constructed key, and to proceed with the communication session when the received key and the originally constructed key match.

In this manner, the method of FIG. 4 represents an example of a method including constructing a key to be used to encrypt or decrypt data of a communication session between the client device and a server device, partitioning the key into a plurality of key partitions, sending data representative of each of the plurality of key partitions to a respective key verification server device of a plurality of key verification server devices, comprising sending data representative of a first key partition of the plurality of key partitions to a first key verification server device of the plurality of key verification server devices, and sending data representative of a second key partition of the plurality of key partitions to a second key verification server device of the plurality of key verification server devices, wherein the first key partition is different than the second key partition and the first key verification server device is different than the second key verification server device, and, after receiving an indication from the server device that the key has been verified using the plurality of key partitions, encrypting or decrypting data exchanged with the server device via the communication session using the key.

Likewise, the method of FIG. 4 represents an example of a method including receiving data representative of a location of a client device participating in a communication session with the server device, wherein data of the communication session is to be encrypted or decrypted using a key, receiving data representative of each of a plurality of key partitions of the key from a respective key verification server device of a plurality of key verification server devices and data representing whether the plurality of key partitions were received by the respective key verification server devices within respective expected time periods based on the location of the client device and locations of the key verification server devices, comprising receiving data representative of a first key partition of the plurality of key partitions from a first key verification server device of the plurality of key verification server devices and data representing whether the first key partition was received by the first key verification server device within a first expected time period based on the location of the client device and a first location of the first key verification server device, and receiving data representative of a second key partition of the plurality of key partitions to a second key verification server device of the plurality of key verification server devices and data representing whether the second key partition was received by the second key verification server device within a second expected time period based on the location of the client device and a second location of the second key verification server device, wherein the first key partition is different than the second key partition and the first key verification server device is different than the second key verification server device, and when each of the plurality of key partitions was received by the respective key verification server devices within the respective expected time periods, encrypting or decrypting data exchanged with the server device via the communication session using the key.

Although the techniques of this disclosure have generally been described with respect to using a symmetric key, it should be understood that in other examples, other encryption and decryption schemes may be used. For example, both the client device and the server device may construct their own keys, such that the client device may construct a client key and the server device may construct a server key. The client device may encrypt data using the client key and decrypt data using the server key, while the server device may encrypt data using the server key and decrypt data using the client key.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method comprising, by one or more processors of a client device:

constructing a key to be used to encrypt or decrypt data of a communication session between the client device and a server device;

partitioning the key into a plurality of key partitions, wherein the plurality of key partitions include a first key partition and a second key partition, the first key partition including data of the key that precedes data of the second key partition in the key;

sending data representative of a location of the client device to the server device;

determining an order in which to send the plurality of key partitions to the server device, the order specifying that the second key partition is to be sent before the first key partition;

sending data representative of each of the plurality of key partitions to a respective key verification server device of a plurality of key verification server devices in the order, comprising:

sending data representative of the second key partition to a first key verification server device of the plurality of key verification server devices; and based on the order, sending data representative of the first key partition to a second key verification server device of the plurality of key verification server devices after sending the data representative of the second key partition, wherein the first key verification server device is different than the second key verification server device; and after receiving an indication from the server device that the key has been verified using the plurality of key partitions and expected arrival times for the key partitions based on distances between the location of the client device and locations of the plurality of key verification server devices, encrypting or decrypting data exchanged with the server device via the communication session using the key.

2. The method of claim 1, wherein receiving the indication from the server device that the key has been verified comprises receiving a message from the server device including the key.

3. The method of claim 2, further comprising determining that the key is verified when the key received from the server matches the constructed key.

4. The method of claim 1, further comprising sending the key to the server device to cause the server device to compare the key to a concatenation of the plurality of key partitions in an original order.

5. The method of claim 1, further comprising receiving, from the server device, an indication of the key verification server devices to which to send the plurality of key partitions.

6. The method of claim 1, further comprising receiving, from the server device, an indication of how to partition the key into the plurality of key partitions and an indication of the order in which to send the plurality of key partitions.

7. The method of claim 1, wherein partitioning the key comprises partitioning the key into the plurality of key partitions such that the first key partition has a first length and the second key partition has a second length different than the first length.

8. The method of claim 1, wherein partitioning the key comprises partitioning the key into the plurality of key partitions such that a number of bits of the data for the first key partition is not byte aligned.

9. A method comprising, by one or more processors of a server device:

receiving data representative of a location of a client device participating in a communication session with the server device, wherein data of the communication session is to be encrypted or decrypted using a key;

determining an order in which each of a plurality of key partitions of the key is to be received, wherein the plurality of key partitions includes a first key partition and a second key partition, the first key partition including data of the key that precedes data of the second key partition in the key, the order specifying that the second key partition is to be received before the first key partition;

receiving data representative of each of the plurality of key partitions of the key from a respective key verification server device of a plurality of key verification server devices and data representing whether the plurality of key partitions were received by the respective key verification server devices within respective expected time periods based on the location of the client device and locations of the key verification server devices, comprising:

receiving data representative of the first key partition from a first key verification server device of the plurality of key verification server devices and data representing whether the first key partition was received by the first key verification server device within a first expected time period based on the location of the client device and a first location of the first key verification server device; and receiving data representative of the second key partition from a second key verification server device of the plurality of key verification server devices and data representing whether the second key partition was received by the second key verification server device within a second expected time period based on the location of the client device and a second location of the second key verification server device, wherein the first key partition is different than the second key partition and the first key verification server device is different than the second key verification server device; and when each of the plurality of key partitions was received by the respective key verification server devices within the respective expected time periods and in the order in which each of the plurality of key partitions is to be received, encrypting or decrypting data exchanged with the server device via the communication session using the key.

10. The method of claim 9, further comprising determining the respective expected time periods based on the location of the client device and locations of the key verification server devices.

11. The method of claim 10, wherein the data representing whether the plurality of key partitions were received by the respective key verification server devices comprises data representing respective times at which the plurality of key partitions were received by the key verification server devices, the method further comprising verifying whether the respective times at which the plurality of key partitions were received by the key verification server devices were received within the respective expected time periods.

12. The method of claim 10, further comprising sending the respective expected time periods to the key verification server devices, wherein the data representing whether the plurality of key partitions were received by the respective key verification server devices comprises data representing indications of whether the respective key verification server devices received the respective key partitions within the respective expected time periods.

13. The method of claim 9, further comprising:
assembling the key from the plurality of key partitions in an original order such that the first key partition precedes the second key partition in the assembled key; and
sending data representing the assembled key to the client device.

14. A client device comprising:
a network interface configured to send and receive data via a network; and
a processor configured to:
construct a key to be used to encrypt or decrypt data of a communication session between the client device and a server device;
partition the key into a plurality of key partitions, wherein the plurality of key partitions includes a first key partition and a second key partition, the first key partition including data of the key that precedes data of the second key partition in the key;
determine an order in which to send the plurality of key partitions to the server device, the order specifying that the second key partition is to be sent before the first key partition;
send, via the network interface, data representative of the key and a location of the client device to the server device;
send, via the network interface, data representative of each of the plurality of key partitions to a respective key verification server device of a plurality of key verification server devices in the order, wherein to send the data representative of each of the plurality of key partitions, the processor is configured to:
send data representative of the second key partition to a first key verification server device of the plurality of key verification server devices; and
send data representative of the first key partition to a second key verification server device of the plurality of key verification server devices after sending the data representative of the second key partition, wherein the first key verification server device is different than the second key verification server device; and
after receiving an indication from the server device that the key has been verified using data representative of the key, the location of the client device, and the plurality of key partitions, encrypt or decrypt data exchanged with the server device via the network interface using the key.

15. The apparatus of claim 14, wherein the processor is configured to receive a message from the server device including the key and to determine that the key is verified when the key received from the server matches the constructed key.

16. The apparatus of claim 14, wherein the processor is further configured to receive, from the server device via the network interface, an indication of the order in which to send the plurality of key partitions and an indication of how to partition the key into the plurality of key partitions.

17. A server device comprising:
a network interface configured to send and receive data via a network; and
a processor configured to:
receive data representative of a location of a client device participating in a communication session with the server device, wherein data of the communication session is to be encrypted or decrypted using a key;
determine an order in which each of a plurality of key partitions of the key is to be received, wherein the plurality of key partitions includes a first key partition and a second key partition, the first key partition including data of the key that precedes data of the second key partition in the key, the order specifying that the second key partition is to be received before the first key partition;
receive data representative of each of a plurality of key partitions of the key from a respective key verification server device of a plurality of key verification server devices and data representing whether the plurality of key partitions were received by the respective key verification server devices within respective expected time periods based on the location of the client device and locations of the key verification server devices, wherein to receive the data representative of each of the plurality of key partitions, the processor is configured to:
receive data representative of the first key partition from a first key verification server device of the plurality of key verification server devices and data representing whether the first key partition was received by the first key verification server device within a first expected time period based on the location of the client device and a first location of the first key verification server device; and
receive data representative of the second key partition from a second key verification server device of the plurality of key verification server devices and data representing whether the second key partition was received by the second key verification server device within a second expected time period based on the location of the client device and a second location of the second key verification server device, wherein the first key partition is different than the second key partition and the first key verification server device is different than the second key verification server device; and
when each of the plurality of key partitions was received by the respective key verification server devices within the respective expected time periods and in the order in which each of the plurality of key partitions is to be received, encrypting or decrypting data exchanged with the server device via the communication session using the key.

18. The server device of claim 17, wherein the processor is further configured to determine the respective expected time periods based on the location of the client device and locations of the key verification server devices, wherein the data representing whether the plurality of key partitions were received by the respective key verification server devices comprises data representing respective times at which the plurality of key partitions were received by the key verification server devices, and wherein the processor is further configured to verify whether the respective times at which the plurality of key partitions were received by the key verification server devices were received within the respective expected time periods.

19. The server device of claim 17, wherein the processor is further configured to determine the respective expected time periods based on the location of the client device and locations of the key verification server devices, and to send the respective expected time periods to the key verification server devices, wherein the data representing whether the plurality of key partitions were received by the respective key verification server devices comprises data representing indications of whether the respective key verification server devices received the respective key partitions within the respective expected time periods.

* * * * *